United States Patent [19]

Kasebayashi et al.

[11] Patent Number: 5,758,191
[45] Date of Patent: May 26, 1998

[54] METHOD FOR BUFFER MANAGEMENT IN A DISK DRIVE HAVING A FIRST SEGMENT FOR STORING BURST DATA AND A SECOND SEGMENT USED FOR WRITE AND READ COMMANDS

[75] Inventors: Tasuku Kasebayashi; Yasuhiko Ichikawa, both of Tokyo, Japan

[73] Assignee: Kabushiki Kaisha Toshiba, Kanagawa-ken, Japan

[21] Appl. No.: 529,528

[22] Filed: Sep. 18, 1995

[30] Foreign Application Priority Data

Jun. 1, 1995 [JP] Japan ................... 7-135221

[51] Int. Cl.$^6$ ................................... G06F 13/00
[52] U.S. Cl. .................. 395/876; 395/404; 395/474; 395/872; 395/849
[58] Field of Search .................. 395/416, 492, 395/671, 825, 849, 404, 474, 872, 876

[56] References Cited

U.S. PATENT DOCUMENTS

| 3,914,747 | 10/1975 | Barnes et al. .............. 395/416 |
|---|---|---|
| 4,542,457 | 9/1985 | Mortensen et al. ........ 395/849 |
| 4,642,763 | 2/1987 | Cummins .................... 395/671 |
| 5,317,713 | 5/1994 | Glassburn ................... 395/425 |
| 5,524,268 | 6/1996 | Geldman et al. ........... 395/825 |
| 5,555,380 | 9/1996 | Suzuki ......................... 395/250 |
| 5,555,400 | 9/1996 | Groves et al. .............. 395/492 |

FOREIGN PATENT DOCUMENTS

4-225444   8/1992   Japan ................. G06F 12/08

*Primary Examiner*—Thomas C. Lee
*Assistant Examiner*—Po C. Huang
*Attorney, Agent, or Firm*—Limbach & Limbach, LLP

[57] ABSTRACT

When a write command is issued by a host computer data promptly transferred in response to the write command is stored in a write area of the data buffer. Thereafter, the start address of a read/write area is changed into the start address of the write area, data transferred from the host computer is stored in the data buffer to be sequential to the data stored in the write area. Thereafter, processing of sequentially the data stored in the read/write area in a magnetic disk is performed. When a read command is issued, the write area is set not to overlap the read/write area.

10 Claims, 5 Drawing Sheets

METHOD FOR BUFFER MANAGEMENT IN A DISK DRIVE HAVING A FIRST SEGMENT FOR STORING BURST DATA AND A SECOND SEGMENT USED FOR WRITE AND READ COMMANDS

BACKGROUND OF THE INVENTION

1. Field of the Invention

The present invention relates to a magnetic disk apparatus having a buffer for temporarily storing data transferring/receiving between a magnetic disk and a host system and a buffer management method in the magnetic disk apparatus, and more particularly to a magnetic disk apparatus having a buffer including an area dedicated to write processing and an area commonly used for read processing and write processing, and a buffer management method in the magnetic disk apparatus.

2. Description of the Related Art

In recent years, a magnetic disk apparatus is used as a secondary storage apparatus for a computer system such as a personal computer or a portable computer. In this magnetic disk apparatus, a fixed magnetic disk (circular plate) is magnetized by using a magnetic head to record data or read out data. The magnetic disk apparatus generally comprises a buffer for storing data because data exchanges at a high speed between a host system connected to the magnetic disk apparatus and the magnetic disk for recording data. This buffer is constituted by DRAM (dynamic random access memory) or the like, and can be accessed at a speed higher than that of a magnetic disk.

When the magnetic disk apparatus receives a command (read command) for reading out data recorded on the magnetic disk from the host system, the magnetic disk apparatus temporarily records the data read from the magnetic disk in the buffer. The data stored in the buffer are sequentially sent to the host system. In this manner, the magnetic disk apparatus can perform look-ahead processing of the data recorded on the magnetic disk. When the magnetic disk apparatus receives a command (write command) for registering data in the magnetic disk from the host system, the magnetic disk apparatus temporarily registers data sent from the host system in the buffer. Thereafter, the data are recorded on the magnetic disk. The magnetic disk apparatus sequentially writes the data sent from the host system in the buffer while the data from the buffer are written in the magnetic disk. Therefore, write processing can be efficiently performed.

Figure 1:
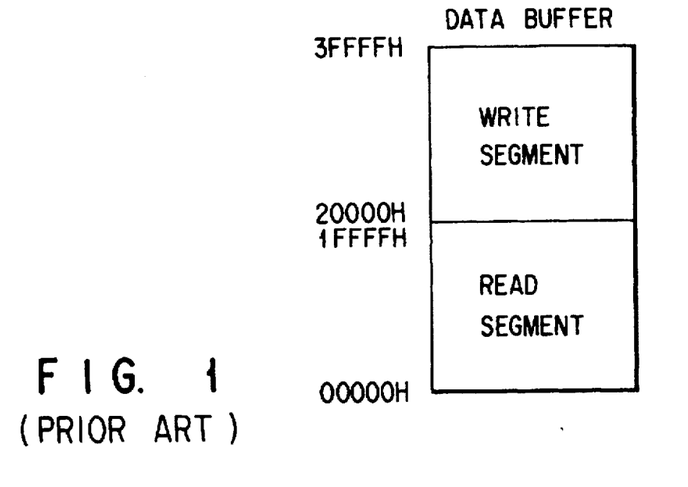
FIG. 1 is a view for explaining the arrangement of a buffer used in a conventional magnetic disk apparatus.

However, in the above buffer, as shown in FIG. 1, a dedicated area, i.e., a write segment, in which the data sent from the host system is written in response to a write command, and an area, i.e., a read segment, in which the data read from the magnetic disk is written in response to a read command. Although addresses from 00000H to 3FFFFH are allocated to the buffer, addresses from 20000H to 3FFFFH are fixedly allocated to the write segment, and addresses 00000H to 1FFFFH are fixedly allocated to the read segment. In the buffer, or example, when the write segment is filled with data in processing corresponding to the write command, reception of data form the host system is waited for. After the data of the write segment is written in the magnetic disk to some extent, the reception of the data from the host system is restarted. For this reason, processing efficiency is degraded due to the size of the write segment. On the other hand, since the size of the read segment is predetermined, the processing efficiency of data sent to the host system may be degraded.

In order to solve the above problem, the following method is available. That is, the memory size of the buffer is increased to increase the memory sizes of the write segment and the read segment. However, in consideration of an increase in size of a magnetic disk apparatus in recent years, this method is not necessarily proper, and the cost of the magnetic disk apparatus increases.

In recent years, the buffer of the magnetic disk apparatus may be used to manage a defect map or to cause a parameter associated with a servo operation to reside in the buffer. The area in which various types of information are stored cannot be used as the write or the read segment. For this reason, a magnetic disk apparatus which uses a buffer having a necessary, minimum size and can improve the performance of a cache using the buffer is demanded.

SUMMARY OF THE INVENTION

It is an object of the present invention to provide a magnetic disk apparatus capable of efficiently using, within a predetermined memory size, a buffer for temporarily storing data exchanging between a host system and a magnetic disk, and a buffer management method in the magnetic disk apparatus.

According to the first aspect of the present invention, there is provided a buffer management method in a magnetic disk apparatus having a buffer for, in response to a command from a host system, temporarily storing information exchanging between a magnetic disk and the host system, comprising the steps of: a) setting, in the buffer, a burst area for storing information sent from the host system by burst transfer; b) setting an area except for the burst area in the buffer as a read/write area; and c) in response to reception of write information send from the host system in the burst transfer, writing the write information in the burst area, and changing a start address of the read/write area into a start address of the burst area.

According to the second aspect of the present invention, there is provided a magnetic disk apparatus connected to a host system, comprising: a buffer for, in response to a command from a host system, temporarily storing information exchanging between a magnetic disk and the host system, the buffer having a burst area for storing information sent from the host system by burst transfer and a read/write area for storing read/write information corresponding to communication between the host system and the magnetic disk apparatus; storage means for storing write information in the burst area in response to a write command from the host system; and address change means for changing a start address of the read/write area into a start address of the burst area in response to completion of storage of the write information by the storage means.

According to the method and apparatus, a burst area for storing information sent from a host system by burst transfer is set in the buffer of the magnetic disk apparatus, and a read/write area is set in the buffer except for the burst area. Write information burst-transferred on the basis of a write command is stored in the burst area. Thereafter, the start address of the read/write area is changed into the start address of the burst area. Subsequently, the burst area set first is used as the read/write area. In this manner, subsequently sent information can be stored to be sequential to the data stored in the burst area.

When the burst area is set as an area larger than an area required to store the write information sent from the host system by the burst transfer, in the buffer, a pointer indicating the position of information written in the magnetic disk next is not wrapped (the pointer does not returns to the start address of the burst area). However, even if the burst area has the same size as that of an area required to store the write information, a pointer wrapped by firmware may be returns to the original position. When an HDC (Hard Disk Controller) constituted not to wrap a pointer is used, the burst area may have the same size as that of the area required to store the write information. Therefore, information is written in the buffer to be sequential to the information sent by the burst transfer after the start address is changed. In the magnetic disk apparatus only requires the pointer to sequentially increment.

According to the third aspect of the present invention, there is provided a magnetic disk apparatus comprising: a buffer for temporarily storing data exchanging between a magnetic disk and a host system, the buffer having a burst area for storing write information sent in accordance with a write command and a read/write area for storing data corresponding to a command from the host system; storage means for storing an address of the burst area and an address of the read/write area in the buffer; read control means for, in response to a read command sent from the host system, changing the addresses stored in the storage means such that the burst area and the read/write area are set in different areas, and sequentially storing data stored in the magnetic disk in the read/write area in accordance with the address stored in the storage means; write control means for, in response to a write command sent from the host system, storing write information following the write command in the burst area in accordance with the address stored in the storage means, changing a start address of the read/write area into a start address of the burst area, and sequentially storing, in the read/write area, data sent sequential to the write information to be sequential to the write information; means for sequentially sending data stored in the read/write area to the host system in response to the read command; and means for sequentially writing data stored in the read/write area in the magnetic disk in response to the write command.

The write control unit is characterized in that, when all data sent from the host system in response to the write command are stored in the read/write area, the burst area is set in the buffer to be sequential to an address at which all the data are written.

According to the apparatus, the burst area (write area) and the read/write area (common area) are set in different areas on the buffer in response to the read command from the host system. Thereafter, in the magnetic disk apparatus, read processing corresponding to the read command, i.e., processing of reading target data from the magnetic disk to sequentially store the data in the read/write area, is performed. In the read processing, all the readout data are stored in the read/write area, but in the burst area. These data stored in the read/write area are sequentially transferred to the host system.

When the write command is sent from the host system, write information following the write command is stored in the burst area. Thereafter, the start address of the read/write area is changed into the start address of the burst area. Data sent sequential to the write information are sequentially stored in the read/write area to be sequential to the write information. These data stored in the read/write area are sequentially written in the magnetic disk.

Upon completion of data write in the magnetic disk, the burst area is set in the buffer to be sequential to an address at which all the data are written.

Since the burst area and the read/write area are set in response to a command from the host system as described above, the buffer having a predetermined memory area can be effectively used.

Additional objects and advantages of the invention will be set forth in the description which follows, and in part will be obvious from the description, or may be learned by practice of the invention The objects and advantages of the invention may be realized and obtained by means of the instrumentalities and combinations particularly pointed out in the appended claims.

BRIEF DESCRIPTION OF THE DRAWINGS

The accompanying drawings, which are incorporated in and constitute a part of the specification, illustrate presently preferred embodiments of the invention and, together with the general description given above and the detailed description of the preferred embodiments given below, serve to explain the principles of the invention.

DETAILED DESCRIPTION OF THE PREFERRED EMBODIMENTS

A magnetic disk apparatus according to an embodiment of the present invention will be described below with reference to the accompanying drawings.

Figure 2:
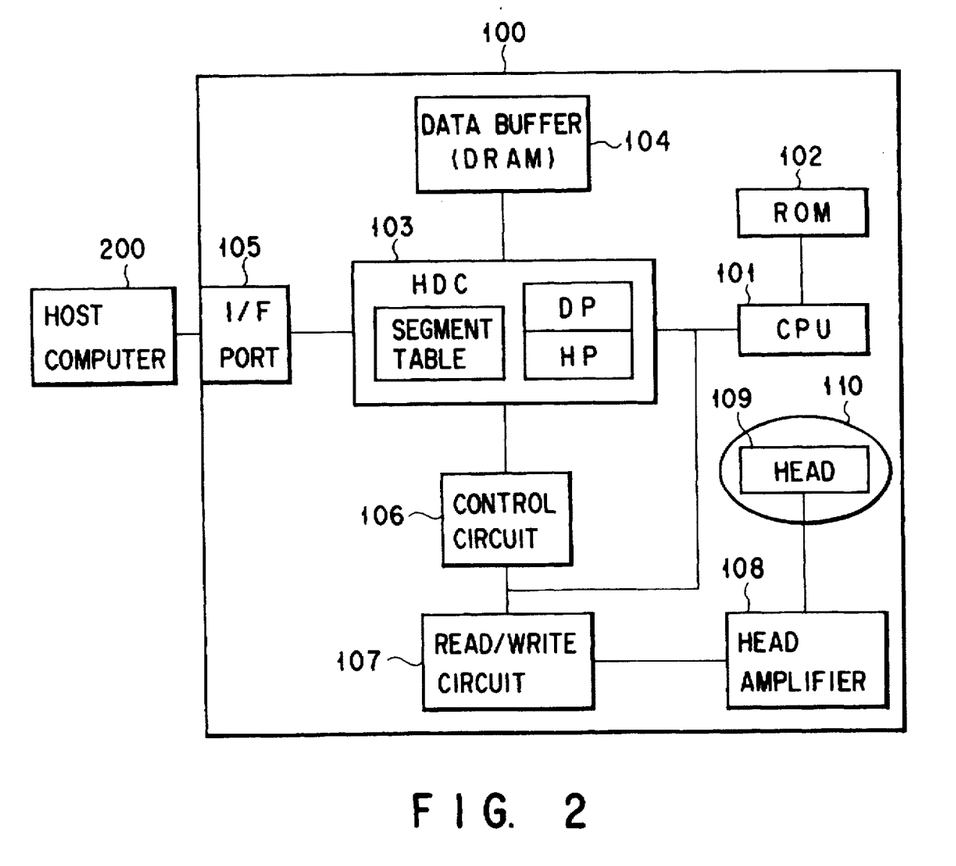
FIG. 2 is a block diagram showing the arrangement of a magnetic disk apparatus according to an embodiment of the present invention.

FIG. 2 shows the schematic arrangement of the magnetic disk apparatus. A magnetic: disk apparatus 100 shown in. FIG. 2 is connected to a host computer (host system) 200, and the magnetic disk apparatus 100 performs various processing corresponding to various command sent from the host system 200.

The magnetic disk apparatus 100 comprises a CPU 101 for controlling the whole apparatus, a ROM 102, an HDC (Hard. Disk Controller) 103, a data buffer 104, an interface port 105, a control circuit 106, a read/write circuit 107, a head amplifier 108, a head 109, and a magnetic disk 110.

As described above, the CPU 101 controls the whole magnetic disk apparatus 100 on the basis of firmware stored in the ROM 102. The HDC 103 performs control related to the communication performed between the HDC 103 and the host computer 200 through the interface port 105. In this communication processing, the HDC 103 temporarily stores, in the data buffer 104, data read from the magnetic disk 110 in response to a read command, and temporarily stores, in the data buffer 104, data sent from the host computer 200 in response to a write command. More specifically, data exchanging between the HDC 103 and the host computer 200 is temporarily stored in the data buffer 104 to perform high-speed read or write processing in the magnetic disk apparatus 100. The HDC 103 holds address information or the like for managing a segment A (read/write area or common area) and a segment B (burst area or write area) as a segment table. In addition, the HDC 103 holds a host pointer (HE.) an address, on the data buffer 104, for writing/reading data in a data exchange between the HDC 103 and the host computer 200, and a disk pointer (DP) for designating an address, on the data buffer 104, for writing/reading data in a data exchange between the HDC 103 and the magnetic disk 110.

The control circuit 106 has a spindle motor or a voice coil motor, and physically controls the head 109 to position the head 109 at a desired position on the magnetic disk 110 under control of the CPU 101. The read/write circuit 107 receives a read signal amplified by the head amplifier 108 and obtained from the head 109 to perform signal processing required for a data reproducing operation. The read/write circuit 107 performs the signal processing required for the data reproducing operation to supply a write current corresponding to write information to the head 109 through the head amplifier 108.

The magnetic disk 110 is media, i.e., a recording medium, in the magnetic disk apparatus 100. The magnetic disk 110 is magnetized by the head 109 to store desired data. Although not shown, the magnetic disk 110 generally has a plurality of circular plates (disks) serving as recording media, and the head 109 is arranged to correspond to each surface of the disks.

Figure 3:
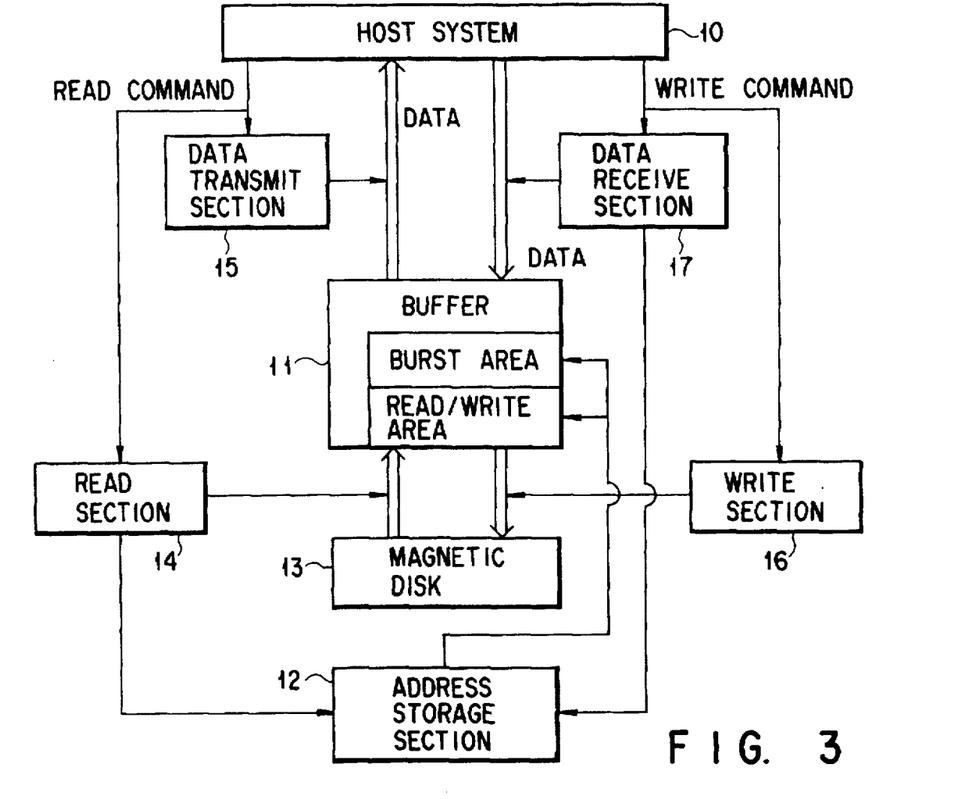
FIG. 3 is a functional block diagram for explaining various functions of the magnetic disk apparatus shown in FIG. 2.

A function in the magnetic disk apparatus according to the present invention will be described below with reference to FIG. 3. A host system 10 is information equipment such as a personal computer in which the magnetic disk apparatus according to the present invention can be mounted. The host system 10 performs an exchange of a command or data between the host system 10 and the magnetic disk under control of a specific control unit. The host system 10 does not have the function of the magnetic disk apparatus according to the present invention, and is not section for performing the function as a matter of course. A buffer 11 is a memory for temporarily storing data exchanging between the buffer 11 and the host system 10, and has a burst area and a read/write area. An address storage unit 12 stores address information representing addresses at which the burst area and the read/write area are set in the buffer 11 in, e.g., a table format. A magnetic disk 13 is a recording medium of the magnetic disk apparatus according to the present invention. The magnetic disk 13 generally has a plurality of disks and can write and read out data by using a head arranged opposite to each disk surface.

A read unit 14 controls the address information stored in the address storage unit 12 in response to a read command sent from the host system 10, reads data required by the host system 10 from the magnetic disk 13, and writes the data in the read/write area indicated by the address information. The read unit 14 change the address information stored in the address storage unit 12 such that the burst area of the buffer 11 does not overlap the read/write area. A transmission unit 15 sequentially transmits data written in the read/write area of the buffer 11 to the host system 10 in units of data amounts.

After the write command is issued by the host system 10, a data reception unit 17 receives data promptly sent from the host system 10, and writes the data in the burst area of the buffer 11 in accordance with the address information stored in the address storage unit 12. The data reception unit 17, in response to the issue of the write command by the host system 10, changes the start address of the read/write area stored in the address storage unit 12 into the start address of the burst area, and writes the promptly sent data such that the data are sequential to the promptly sent data in the buffer 11. A write unit 16 sequentially writes, the magnetic disk 13, data written in the read/write area of the buffer 11 by the data reception unit 17.

Figure 4:
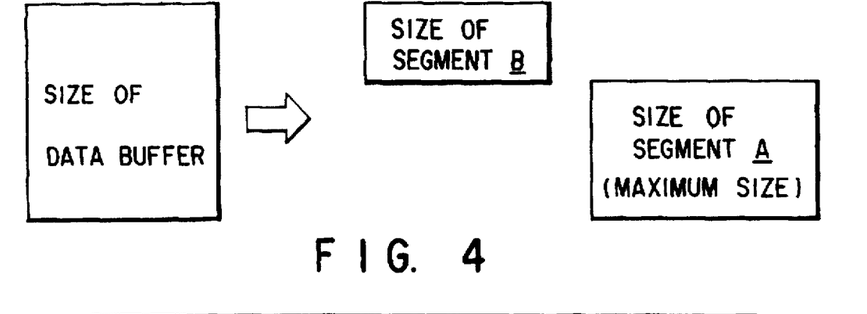
FIG. 4 is a view for explaining the sizes of a segment A (read/write area) and a segment B (burst area) of data buffer in the magnetic disk apparatus shown in FIG. 2.

The segments A and B set in the data buffer will be described below with reference to FIG. 4. The segment A is an area used to transfer data exchanging between the host computer 200 and the magnetic disk 110, and is also a common area used during read and write operations. The segment B is a burst area dedicated to reception of data transferred in response to a write command sent from the host computer. Each segment is not fixed at a predetermined address, and has a size which can be changed. In this case, the relationship between the sizes of the segments is shown in FIG. 4. The size of the segment A shown in FIG. 4 is maximum when the size of the segment B is set as shown in FIG. 4.

The segments can be set to overlap. That is, the segment B is set within the segment A or on the boundary of the segment A. However, the size of the segment B is a size obtained by adding one to the number of data blocks which are promptly transferred (burst-transferred) or follow the write command when the write command is issued from the host computer. Note that "promptly transferred" and "follow the write command" mean that the host computer 200 does not permit the magnetic disk apparatus 100 to wait for data to be transferred. For example, a multi-count set by a multiple write command in an AT interface corresponds to the number of blocks. As shown in FIG. 4, the size of the segment A can be maximally set to be a size obtained by subtracting the size of the segment B from the size of the data buffer 104.

Figure 5:
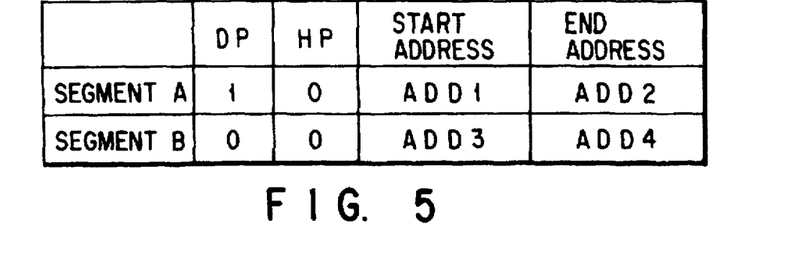
FIG. 5 is a segment table held by a hard disk controller in the magnetic disk apparatus shown in FIG. 2.

A segment table will be described below with reference to FIG. 5. The segment table shown in FIG. 5 stores the start addresses and end addresses of the segments A and B as AD1 to AD4. The segment table has bit information representing whether each segment is effective as a host pointer and a disk pointer. In this case, bit information "1" indicates effectiveness, and bit information "0" indicates ineffectiveness. More specifically, the segment A shown in FIG. 5 is effective for the disk pointer, and indicates that the segment A is permitted to read data from the magnetic disk 110 or that the segment A is permitted to write data in the magnetic disk 110.

Figure 6:
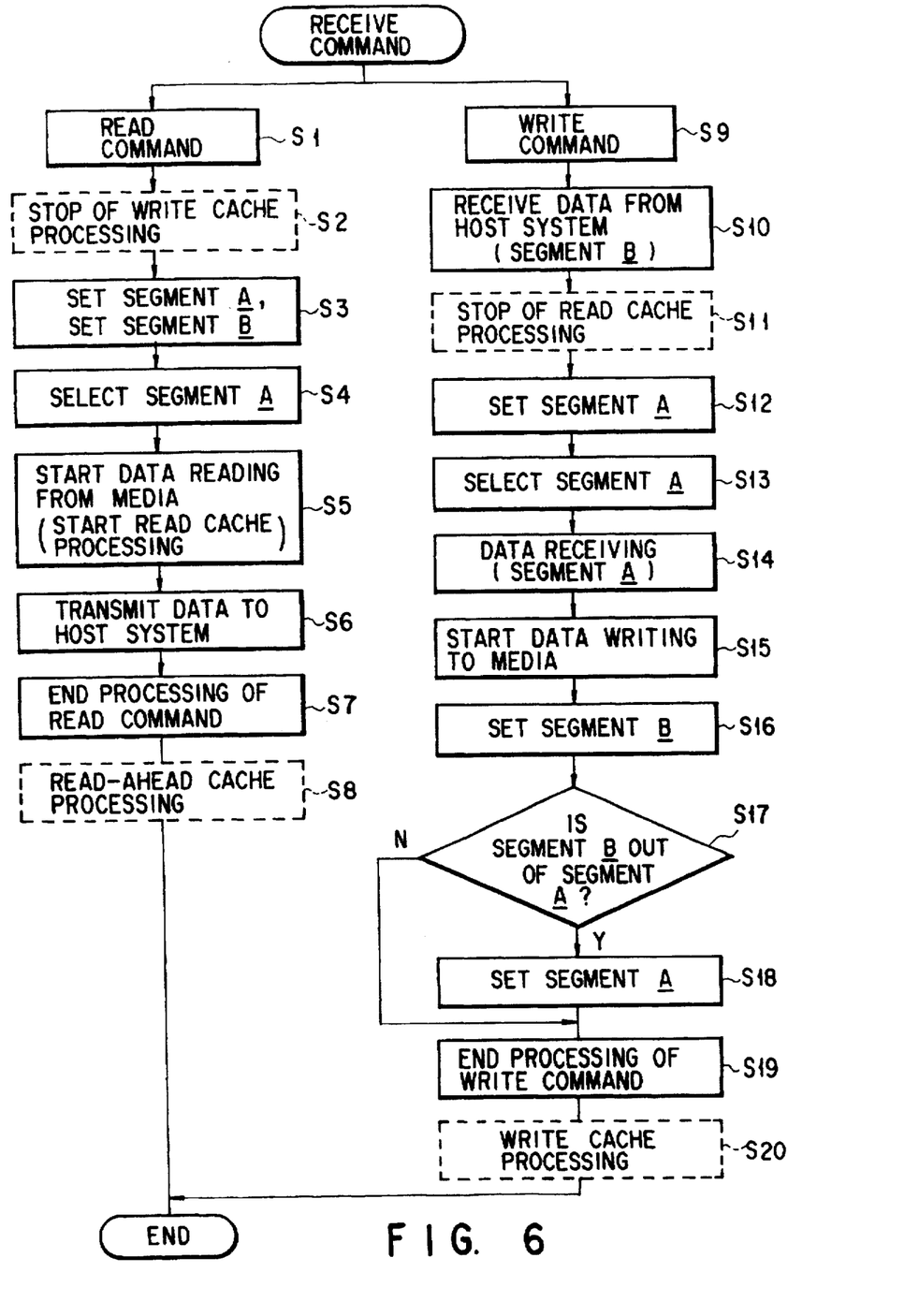
FIG. 6 is a flow chart for explaining an operation of the magnetic disk apparatus shown in FIG. 2.
Figure 7:
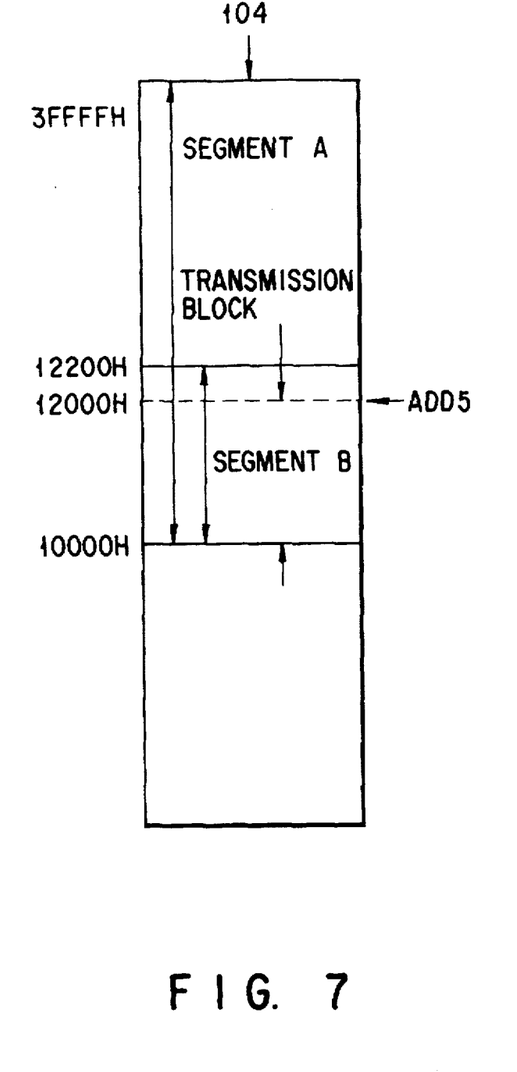
FIG. 7 is a view for explaining the state of a data buffer used during write processing in the magnetic disk apparatus shown in FIG. 2.
Figure 8:
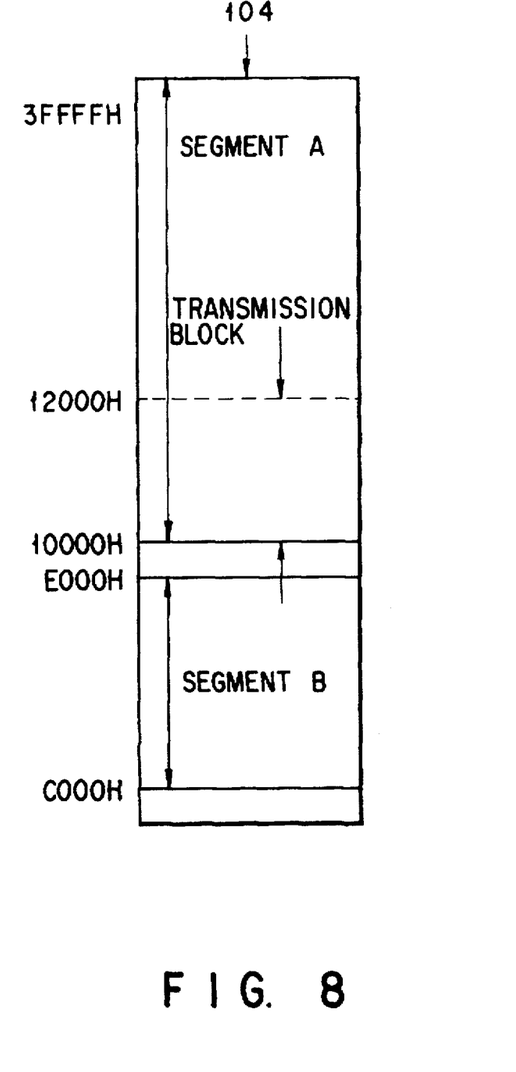
FIG. 8 is a view for explaining the state of a data buffer in use during read processing in the magnetic disk apparatus shown in FIG. 2.

The operation of the present invention will be described below with reference to the flow chart in FIG. 6 and FIGS. 7 and 8. Note that FIG. 7 shows the state of the data buffer 104 when a write command is issued by the host computer, and FIG. 8 shows the state of the data buffer 104 when a read command is issued.

A case wherein the read command is issued by the host computer 200 will be described below. When the read command is issued by the host computer (step Si), if a write cache is operating, the magnetic disk apparatus 100 stops write cache processing (step S2). Thereafter, the segments A and B are set in the data buffer 104 (step S3). The state of the data buffer set in this case is shown in FIG. 8. At this time, the segment E; is set to be located outside the segment A, i.e., the segment table is changed (step S4). Processing is performed to the segment table to select the segment A. This processing is performed as follows. That is, the disk pointer and host pointer corresponding to the segment A are set to be "1" to make it effective to write read data from the disk in the segment A and to transfer data to the host computer.

Thereafter, data stored in the magnetic disk 110 is loaded in the segment A in accordance with the disk pointer (step S5). In accordance with the host pointer, data is sent from the segment A of the data buffer to the host computer 200 (step S6). Upon completion of data transfer, in the magnetic disk apparatus, as a look-ahead operation, the data from the magnetic disk 110 is loaded in the segment A in accordance with an address subsequent to an address designated by the read command from the host computer 200 (steps S7 and S8).

An operation performed when a write command is issued by the host computer 200 will be described below. When the write command is issued by the host computer 200 (step S9), and the magnetic disk apparatus 100 receives data promptly sent in response to the command, the magnetic disk apparatus 100 stores the data in the segment B (step S10). In this case, assume that a data amount which follows the write command or is promptly, continuously sent after the write command is issued is set to be 16 blocks (512 bytes/block). In this case, since the size of the segment B is set to be 17 blocks (2200H bytes), the host pointer is not wrapped. Upon completion of a data write operation in the segment B, the magnetic disk apparatus 100 is permitted to wait for data to be transferred to the host computer 200. For this reason, when look-ahead processing is performed in the segment A, this processing is stopped (step S11).

When the look-ahead processing start address of start address of the segment B is set at the start address of the segment A (step S12). In addition, the disk pointer of the segment A is changed to designate the start address of the segment A, and the host pointer is changed to designate an address ADD5 next to the data written in the segment B (step S13). The state of the data buffer 104 to which the setting processing is performed is shown in FIG. 7. Thereafter, data sent from the host computer 200 is stored to be sequential to the data stored in the segment B first (step S14). In this manner, all data sent from the host computer 200 are stored in the segment A. Therefore, in the magnetic disk apparatus 100, processing of writing the data stored in the data buffer 104 in the magnetic disk 110 is started in accordance with the disk pointer (step S15).

Upon completion of data transfer from the host computer 200, when the data written in the data buffer is also written at address ADD5 in FIG. 7, the start address of the segment B is set to be the address ADD5 (step S16). In this case, when the segment B is located outside the segment A, after the write processing for the magnetic disk 110 is finished, for example, the start address of the segment B is set to be the start address of the segment A (steps S17 and S18).

When the write cache operation is permitted, after the magnetic disk apparatus 100 receives data, the write command is immediately ended (step S19). For this reason, data may be continuously written in the magnetic disk apparatus 100. In this case, when a write command is sequentially is issued, after the buffer 11 receives data, write processing for the magnetic disk 110 continues. For this reason, the segment A is not set, the write processing can be performed to the magnetic disk 110 without waiting for rotation of the magnetic disk 110 (step S20). Therefore, processing efficiency does not degraded during the write cache operation.

With the above processing, the data buffer can be efficiently used within a predetermined memory size without increasing the data buffer itself in size.

In the data write operation of this embodiment, after data sent by burst transfer is written in the burst area, a common area is set to include the burst area, sequentially sent data is written in the common area. Instead of changing the burst area for the common area to receive data after the burst transfer however, after the data sent by the burst transfer is written in the burst area, the size of the burst area and the common area are set to be the maximum size (same size of the common area) which can be used to temporarily store data in the data buffer, sequential data may be written in the burst area. However, when the data write processing for the data buffer is finished; the size of the burst area must returns to the size obtained immediately before the burst transfer.

A modification of the above magnetic disk apparatus will be described below with reference to FIGS. 9A to 9C. Note that the burst area is to be referred to as a data reception area hereinafter, and addresses to be used are expressed in hexadecimal number.

Figures 9A, 9B:
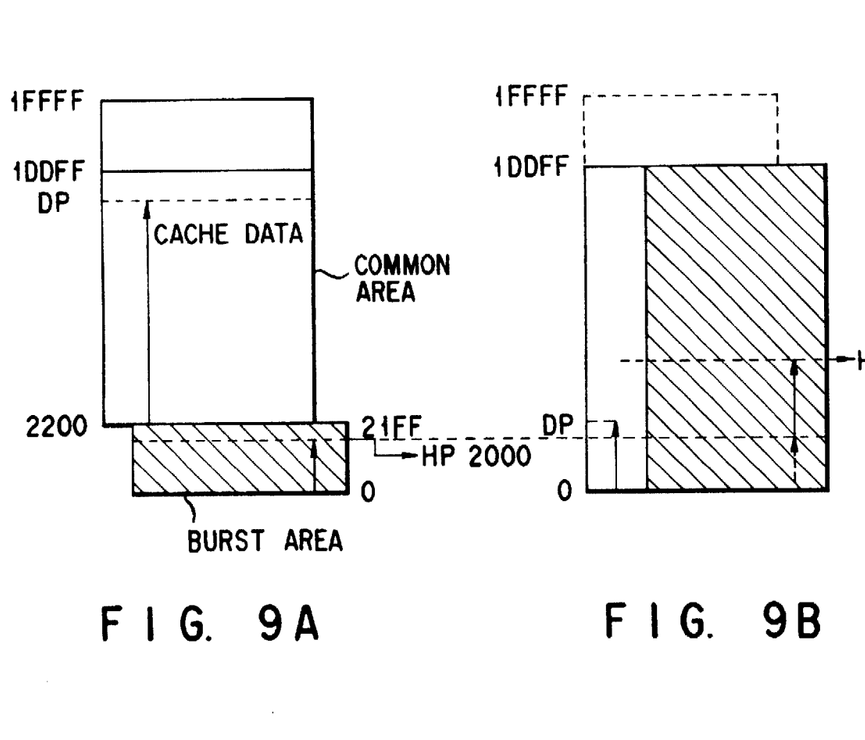
FIGS. 9A to 9C are views showing the states of a data buffer in use to explain a modification of the magnetic disk apparatus shown in FIG. 2.

FIG. 9A shows a data buffer set in a state wherein data stored in the magnetic disk is cached. In this case, information, such as a defect map, for management is resident in an area between address 1DE00 and address 1FFFF, this area is not used to write data exchanging between the magnetic disk and the host computer. During a read command operating or a ahead cache operating, the data reception area is set to be an area between address 0 and address 21FF and the common area is set to be an area between address 2200 and 1DDFF. Note that, in this modification, the size of the data sent by the burst transfer is 2000H.

When a write command is issued by the host computer, data reception is started and an interrupt processing of a cache operation is executed. In this case, the data sent by the burst transfer is written in a storage area between address 0 to address 1FFF.

When the interrupt processing of the cache operation and the writing data sent by the burst transfer are completed, as shown in FIG. 9B, the size of the data reception area defined by address 0 and address 21FF is expanded into a size defined by address 0 and address 1DDFF, and the size of the common area defined by address 2200 and address 1DDFF is expanded into a size defined by address 0 and address 1DDFF. In this manner, data sent subsequent to the burst transfer is written to be sequential to the data written in the burst transfer, i.e., written below address 2000. Note that data is written in the magnetic disk at any time in accordance with the disk pointer DP of the common area.

Figure 9C:
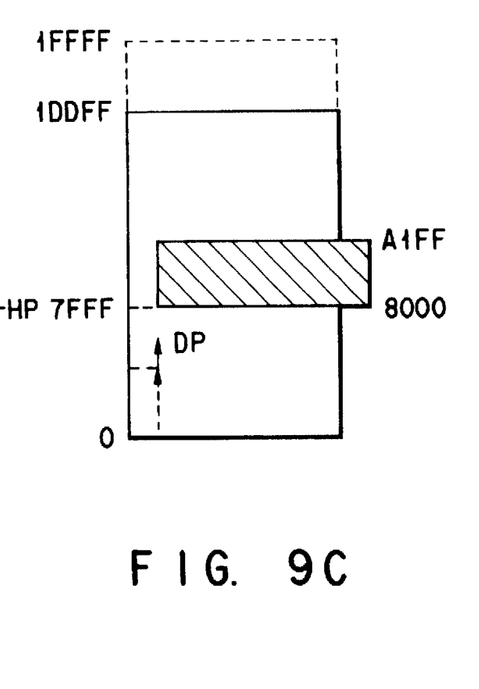

The state of the data buffer upon completion of reception of data from the host computer is shown in FIG. 9C. As shown in FIG. 9C, data sent from the host computer is written up to address 7FFF in the data buffer. In reception of completion of reception of data written in the magnetic disk, the size of the data reception area returns to the size obtained before the burst transfer, i.e., address 21FF. However, since the start address of the data reception area is 8000, the data reception area is storage area between address 8000 and address A1FF.

As a matter of course, when the data buffer is used to sent data stored in the magnetic disk to the host computer, the data reception area is not used.

In this manner, as described in the above modification, after data sent by the burst transfer is received, instead of changing the read/write area (common area) to the data reception area, the same effect as described in the above embodiment can be obtained by expanding/contracting the size of the burst area (data reception area). That is, the data buffer can be efficiently used within a predetermined memory size without increasing the data buffer itself in size.

A most difference between the embodiment and the modification is whether the segment A or segment B to be received data transferred by the host system, after the data sent by the burst transfer has been written into the segment A.

Generally, when the pointers HP and DP both of same segment are effective, a buffer control processing is executed so that an address of the pointer HP is not above an address of the pointer DP during processing according to the read command and that the address of the pointer DP is not above the address of the pointer HP during the processing according to the write command. Therefore, in this modification, after the burst transfer, it is necessary to control the pointer DP of the segment A and the pointer HP of the segment B by linking each other.

As has been described above, according to the present invention, a buffer for temporarily storing data exchanging between the host system and the magnetic disk can be efficiently used within a predetermined memory size.

Additional advantages and modifications will readily occur to those skilled in the art. Therefore, the invention in its broader aspects is not limited to the specific details, representative devices, and illustrated examples shown and described herein. Accordingly, various modifications may be made without departing from the spirit or scope of the general inventive concept as defined by the appended claims and their equivalents.

What is claimed is:

1. A buffer management method applied to a disk drive comprising a buffer for temporarily storing data which is exchanged between a disk and a host system, said buffer including a first segment for storing burst data which is to be transferred sequentially with respect to a write command issued by the host system, and a second segment used for the write command and a read command also issued by the host system, said buffer management method comprising the steps of:

allocating the first and second segments to different areas of the buffer in accordance with the read command;

sequentially storing read data assigned by the read command and read out from the disk to the second segment after allocation and sequentially transferring the read data from the second segment to the host system;

executing read-ahead cache processing corresponding to the read command after the read data has been transferred to the host system;

selecting the first segment in accordance with the write command, storing the burst data corresponding to the write command in the first segment, and stopping the read-ahead cache processing;

changing a start address of the second segment to a start address of the first segment after the read-ahead cache processing is stopped, and determining an end address of the second segment such that the second segment includes the first segment; and storing in the second segment write data which the host system sends after the burst data, such that the write data is sequential to the burst data in the second segment, and then sequentially writing in the disk the burst data and write data stored in the second segment, said write data being stored in the second segment after the end address of the second segment is determined.

2. A buffer management method according to claim 1, wherein said disk drive includes a host pointer which indicates an address of the buffer and is incremented in accordance with data transfer from the buffer to the host system in an amount in which the data sent from the host system is stored in the buffer, and a disk pointer which indicates an address of the buffer and is incremented in accordance with data transfer from the buffer to the disk in an amount in which the data sent from the disk is stored in the buffer, said host pointer and said disk pointer wrapping around to the start address of the first segment when the addresses indicated by the host pointer and disk pointer coincide with the end address as the first segment and to the start address of the second segment when the addresses indicated by the host pointer and disk pointer coincide with the end address of the second segment;

said step of allocating the first and second segments to the different areas includes a step of setting the host pointer and the disk pointer to the same address of the second segment;

said step of selecting the first segment including a step of setting the host pointer to the start address of the first segment; and said step of determining the end address of the second segment including a step of setting the disk pointer to the start address of the second segment while keeping the host pointer unchanged.

3. A disk drive comprising:

a buffer for temporarily storing data which is exchanged between a disk and a host system, said buffer including a first segment for storing burst data which is to be transferred sequentially with respect to a write command issued by the host system, and a second segment used for the write command and a read command also issued by the host system;

selected means for selecting the second segment by allocating the first and second segments to different areas of the buffer in accordance with the read command;

read processing means for sequentially storing read data assigned by the read command and read out from the disk in the second segment after allocation, and then for sequentially transferring the read data from the second segment to the host system;

read-ahead means for executing read-ahead cache processing corresponding to the read command after the read data has been transferred to the host system, and for storing the burst data in the first segment in response to receipt of the write command during the execution of the read-ahead cache processing, such that data which is preread by the read-ahead cache processing is not overwritten;

stopping means for selecting the first segment in accordance with the write command, storing the burst data corresponding to the write command in the first segment, and stopping the read-ahead cache processing;

means for changing a start address of the second segment to a start address of the first segment after the read-ahead cache processing is stopped, and determining an end address of the second segment such that the second segment includes the first segment; and write processing means for selecting the second segment after the end address of the second segment is determined, for storing in the second segment write data which the host system sends after the burst data such that the write data is sequential to the burst data in the second segment, and for sequentially writing in the disk the burst data and write data stored in the second segment.

4. A disk drive according to claim 3, further comprising:

a host pointer which indicates an address of the buffer and is incremented in accordance with data transferred from the buffer to the host system in an amount in which the data sent from the host system is stored in the buffer; and a disk pointer which indicates an address of the buffer and is incremented in accordance with data transferred from the buffer to the disk in an amount in which the data sent from the disk is stored in the buffer, said host pointer and said disk pointer wrapping around to the start address of the first segment when the addresses indicated by the host pointer and the disk pointer coincide with the end address of the first segment, and to the start address of the second segment when the addresses indicated by the host pointer and disk pointer coincide with the end address of the second segment, said selecting means setting the host pointer and the disk pointer to the same address of the second segment, said stopping means setting the host pointer to the start address of the first segment, and said setting means setting the disk pointer to the start address of the second segment while keeping the host pointer unchanged.

5. A disk drive according to claim 3, wherein said first segment is greater in size than the burst data.

6. A disk drive according to claim 3, wherein said setting means sets the buffer such that all areas of the buffer are used as the second segment, except for the first segment of the buffer.

7. A disk drive comprising:

a buffer for temporarily storing data which is exchanged between a disk and a host system, said buffer including a first segment for storing burst data which is to be transferred sequentially with respect to a write command issued by the host system, and a second segment used for the write command and a read command also issued by the host system;

a host pointer which indicates an address of the buffer and is incremented in accordance with data transferred from the buffer to the host system in an amount in which the data sent from the host system is stored in the buffer, said host pointer wrapping around to a start address of the first segment when the address indicated by the host pointer coincides with an end address of the first segment, and to a start address of the second segment when the address indicated by the host pointer coincides with an end address of the second segment;

a disk pointer which indicates an address of the buffer and is incremented in accordance with data transferred to the disk in an amount in which the data sent from the disk is stored in the buffer, said disk pointer wrapping around to the start address of the first segment when the address indicated by the disk pointer coincides with the end address of the first segment, and to the start address of the second segment when the address indicated by the disk pointer coincides with the end address of the second segment;

holding means for holding address information representing the start and end addresses of the first and second segments, and pointer information representing in which segment of the first and second segments the host and disk points are used;

setting means for setting said address information in accordance with the read command such that the first and second segments are allocated to different areas of the buffer, for setting said pointer information such that the host pointer and the disk pointer are used in the second segment, and for setting the host and disk points to the start address of the second segment;

read processing means for sequentially storing read data assigned by the read command and read out from the disk in the second segment in accordance with the address information and the pointer information, after a setting operation is performed by the setting means, and for sequentially transferring the read data from the second segment to the host system;

read-ahead means for executing read-ahead cache processing corresponding to the read command by use of the second segment, after the read data has been transferred to the host system;

stopping means for causing the read-ahead means to stop the read-ahead cache processing in accordance with the write command;

burst processing means for setting the pointer information in accordance with the write command such that the host pointer can be used in the first segment, for setting the host pointer to the start address of the first segment, and for storing the burst data in the first segment in accordance with the pointer information and the address information; and write processing means, operating after the burst data has been stored, for determining the address information such that the start address of the second segment is used as the start address of the first segment and such that the second segment includes the first segment, for determining the pointer information such that the host pointer and the disk pointer are used in the second segment, for storing in the second segment the write data which the host system sends after the burst data, in accordance with the address information and the pointer information, such that the write data is sequential to the burst data in the second segment, and for sequentially writing in the disk the burst data and the write data stored in the second segment.

8. A disk drive according to claim 7, wherein said first segment has a predetermined size, and said write processing means changes the address information after all the write data is written in the disk, such that the start address of the first segment is continued with the address indicated by the disk pointer.

9. A disk drive according to claim 7, wherein the first segment is greater in size than the burst data.

10. A disk drive comprising:

a buffer for temporarily storing data which is exchanged between a disk and a host system, said buffer including a first segment for storing burst data which is to be transferred sequentially with respect to a write command issued by the host system, and a second segment used for the write command and a read command also issued by the host system;

a host pointer which indicates an address of the buffer and is incremented in accordance with the data transferred to the host system in an amount in which the data sent from the host system is stored in the buffer, said host pointer wrapping around to a start address of the first segment when the address indicated by the host pointer coincides with an end address of the first segment, and to a start address of the second segment when the address indicated by the host point coincides with an end address of the second segment;

a disk pointer which indicates an address of the buffer and is incremented in accordance with the data transferred to the disk in an amount in which the data sent from the disk is stored in the buffer, said disk pointer wrapping around to the start address of the first segment when the address indicated by the disk pointer coincides with the end address of the first segment, and to the start address of the second segment when the address indicated by the disk pointer coincides with the end address of the second segment;

read processing means for allocating the first and second segments to different areas of the buffer in accordance with the read command, for setting the host pointer and the disk pointer to the same address of the second segment, for sequentially storing the read data assigned by the read command in accordance with the host pointer and the disk pointer, and for sequentially transferring the read data from the second segment to the host system;

read-ahead means for executing read-ahead cache processing corresponding to the read command by use of the second segment, after the read data has been transferred to the host system;

stopping means for causing the read-ahead means to stop the read-ahead cache processing in accordance with the write command;

burst processing means for setting the pointer information in accordance with the write command such that the host pointer can be used in the first segment, for setting the host pointer to the start address of the first segment, and for storing the burst data in the first segment in accordance with the pointer information and the address information; and write processing means, operating after the burst data has been stored, for setting the address information such that the start address of the second segment is used as the start address of the first segment and such that the second segment includes the first segment, for setting the pointer information such that the host pointer and the disk pointer are used in the second segment, for storing in the second segment write data which the host system sends after the burst data, in accordance with the address information and the pointer information, such that the write data is sequential to the burst data in the second segment, and for sequentially writing in the disk the burst data and write data stored in the second segment, wherein said write processing means changes the start address of the first segment to the address indicated by the host pointer after all the write data is written in the disk, and further changes the end address of the second segment to the end address of the first segment if the second segment includes the first segment after the start address of the first segment is changed, and wherein, if said write command is followed by another write command, burst data corresponding to said another write command is stored in the first segment.

* * * * *